US011618452B2

United States Patent
Hawley

(10) Patent No.: US 11,618,452 B2
(45) Date of Patent: Apr. 4, 2023

(54) POWERTRAIN TORQUE LIMITATION TO ENSURE LOCK-UP CLUTCH ENGAGEMENT DURING HIGH TEMPERATURE TRANSMISSION FLUID CONDITION

(71) Applicant: Toyota Motor Engineering & Manufacturing North America, Inc, Plano, TX (US)

(72) Inventor: Thomas S. Hawley, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/243,978

(22) Filed: Apr. 29, 2021

(65) Prior Publication Data

US 2022/0348206 A1 Nov. 3, 2022

(51) Int. Cl.
*B60W 10/06* (2006.01)
*B60W 30/188* (2012.01)
*B60W 10/02* (2006.01)

(52) U.S. Cl.
CPC ........ *B60W 30/188* (2013.01); *B60W 10/026* (2013.01); *B60W 10/06* (2013.01); *B60W 2510/0233* (2013.01); *B60W 2510/104* (2013.01); *B60W 2510/107* (2013.01); *B60W 2520/10* (2013.01); *B60W 2520/12* (2013.01); *B60W 2710/024* (2013.01); *B60W 2710/0666* (2013.01)

(58) Field of Classification Search
CPC .. B60W 30/188; B60W 10/026; B60W 10/06; B60W 2510/0233; B60W 2510/107; B60W 2520/10; B60W 2710/024; B60W 2710/0666; B60W 2510/104
USPC ......................................... 477/83, 84, 62, 64
See application file for complete search history.

(56) References Cited

U.S. PATENT DOCUMENTS

| 6,537,178 | B1 * | 3/2003 | Takizawa | F16H 61/143 |
| | | | | 477/76 |
| 7,806,803 | B2 | 10/2010 | Shultz et al. | |
| 8,079,933 | B2 | 12/2011 | Kaminsky et al. | |
| 9,827,987 | B2 | 11/2017 | Reich et al. | |
| 2002/0160882 | A1 * | 10/2002 | Michioka | F16H 61/143 |
| | | | | 477/168 |
| 2008/0245635 | A1 * | 10/2008 | Mauti | F16H 45/02 |
| | | | | 192/3.28 |

(Continued)

FOREIGN PATENT DOCUMENTS

JP 2006022939 A * 1/2006

*Primary Examiner* — Roger L Pang
(74) *Attorney, Agent, or Firm* — Jordan IP Law, LLC

(57) ABSTRACT

A vehicle, a vehicle powertrain system, a computer program product, and a method of controlling a vehicle in a manner to achieve enhanced driving performance. An example vehicle powertrain system includes one or more of a powertrain having an engine, a transmission, and a torque converter, and a control module to control the powertrain system. The control module is configured to conduct, in response to sensor data in connection with a detected current vehicle speed and a detected current transmission oil temperature, a vehicle powertrain analysis of the sensor data. The control module is to then control the powertrain in response to the vehicle powertrain analysis and an operating state of a lock-up clutch of the torque converter.

20 Claims, 6 Drawing Sheets

(56) References Cited

U.S. PATENT DOCUMENTS

| | | | |
|---|---|---|---|
| 2014/0080671 A1* | 3/2014 | Maruyama | F16H 61/143 |
| | | | 477/168 |
| 2014/0163787 A1* | 6/2014 | Gibson | B60W 30/181 |
| | | | 180/65.265 |
| 2014/0257657 A1 | 9/2014 | Plante | |
| 2020/0216057 A1 | 7/2020 | Bellino et al. | |
| 2021/0237733 A1* | 8/2021 | Oue | B60W 10/06 |
| 2021/0293167 A1* | 9/2021 | Kaneko | F02D 41/029 |

* cited by examiner

POWERTRAIN TORQUE LIMITATION TO ENSURE LOCK-UP CLUTCH ENGAGEMENT DURING HIGH TEMPERATURE TRANSMISSION FLUID CONDITION

TECHNICAL FIELD

One or more embodiments relate generally to a vehicle, a vehicle powertrain system, a computer program product, and a method of controlling a vehicle in a manner to achieve enhanced driving performance.

BACKGROUND

During operation of a vehicle operation, an issue of high transmission oil temperature (THO) being high occurs in instances where torque converter slippage occurs when the vehicle is either in a stopped or low speed operating condition. The torque converter generates the greatest amount of heat when in an open and a full slip operating state. When THO is excessive, the torque converter lock-up (LU) clutch may be pulled prematurely in order reduce the amount of heat generation, but this sacrifices driveability of the vehicle. The issue still remains, large slip is generated when the input torque is high, and thus, the lock-up clutch of the torque converter cannot be engaged until the slip rpm between the engine rotational speed and turbine rotational speed is reduced.

BRIEF SUMMARY

In accordance with one or more embodiments, a control module/ECU is provided for precise control of a vehicle powertrain in order to limit the input torque to the torque converter from the engine or motor during a fully open operating state of the torque converter. The fully open operating state has a high loss factor and generates an excessive amount of heat. When the torque converter is operating at a large slip, it is difficult to engage the LU clutch without generating additional heat.

Should, however, torque be reduced during engagement of the LU clutch, engagement of the LU clutch can occur quickly with less heat generation. Such operational control of the vehicle powertrain would occur in instances when the vehicle is in an extreme THO overheated condition. Reducing the input torque to the torque converter in an engaged operating condition of the LU clutch serves to reduce slippage to a permissible value to engage the LU clutch. The control module/ECU can operate from an open operating state of the LU clutch, or when engagement of the lock-up clutch is commanded by a vehicle driver/operator.

Accordingly, the control module/ECU is configured to initiate different control sequences for controlling the powertrain system based on a detected transmission oil temperature. The first control sequence is executed in a vehicle operation condition in which, during an open operating state of the LU clutch, a sweep the engine torque downward is done to prevent excessive slip and also prevent an unintended torque drop from the vehicle operator. The second control sequence is executed to sweep the engine torque down during a lock-up control phase, which would facilitate enhanced launch driveability and only reduce the engine toque drop during engagement of the LU clutch.

In accordance with one or more embodiments, an example vehicle powertrain system comprises one or more of the following: a powertrain having an engine, a transmission, and a torque converter; and a control module having one or more processors, to execute a set of instructions that cause the one or more processors to: conduct, in response to sensor data in connection with a detected current vehicle speed and a detected current transmission oil temperature, a vehicle powertrain analysis of the sensor data; and control the powertrain in response to the vehicle powertrain analysis and an operating state of a lock-up clutch of the torque converter.

In accordance with one or more embodiments, an example vehicle powertrain system comprises one or more of the following: a powertrain having an engine, a transmission, and a torque converter; a sensor module to dynamically detect as sensor data, a current vehicle speed and a current transmission oil temperature; and a control module having one or more processors, to execute a set of instructions that cause the one or more processors to: conduct, in response to the sensor data, a vehicle powertrain analysis of the sensor data; and control the powertrain in response to the vehicle powertrain analysis and an operating state of a lock-up clutch of the torque converter.

In accordance with one or more embodiments, an example computer program product is provided for a vehicle having a powertrain having an engine, a transmission, and a torque converter. The example computer program product includes at least one computer readable medium comprising a set of instructions, which when executed by one or more processors, cause the one or more processors to: conduct, in response to sensor data in connection with a detected current vehicle speed and a detected current transmission oil temperature, a vehicle powertrain analysis of the sensor data; and control the powertrain in response to the vehicle powertrain analysis and an operating state of a lock-up clutch of the torque converter.

In accordance with one or more embodiments, an example method of controlling a vehicle including a powertrain having an engine, a transmission, and a torque converter, comprises one or more of the following: conducting, in response to sensor data in connection with a detected current vehicle speed and a detected current transmission oil temperature, a vehicle powertrain analysis of the sensor data; and controlling the powertrain in response to the vehicle powertrain analysis and an operating state of a lock-up clutch of the torque converter.

BRIEF DESCRIPTION OF THE SEVERAL VIEWS OF THE DRAWINGS

The various advantages of the embodiments of the present disclosure will become apparent to one skilled in the art by reading the following specification and appended claims, and by referencing the following drawings, in which:

DETAILED DESCRIPTION

Figure 1:
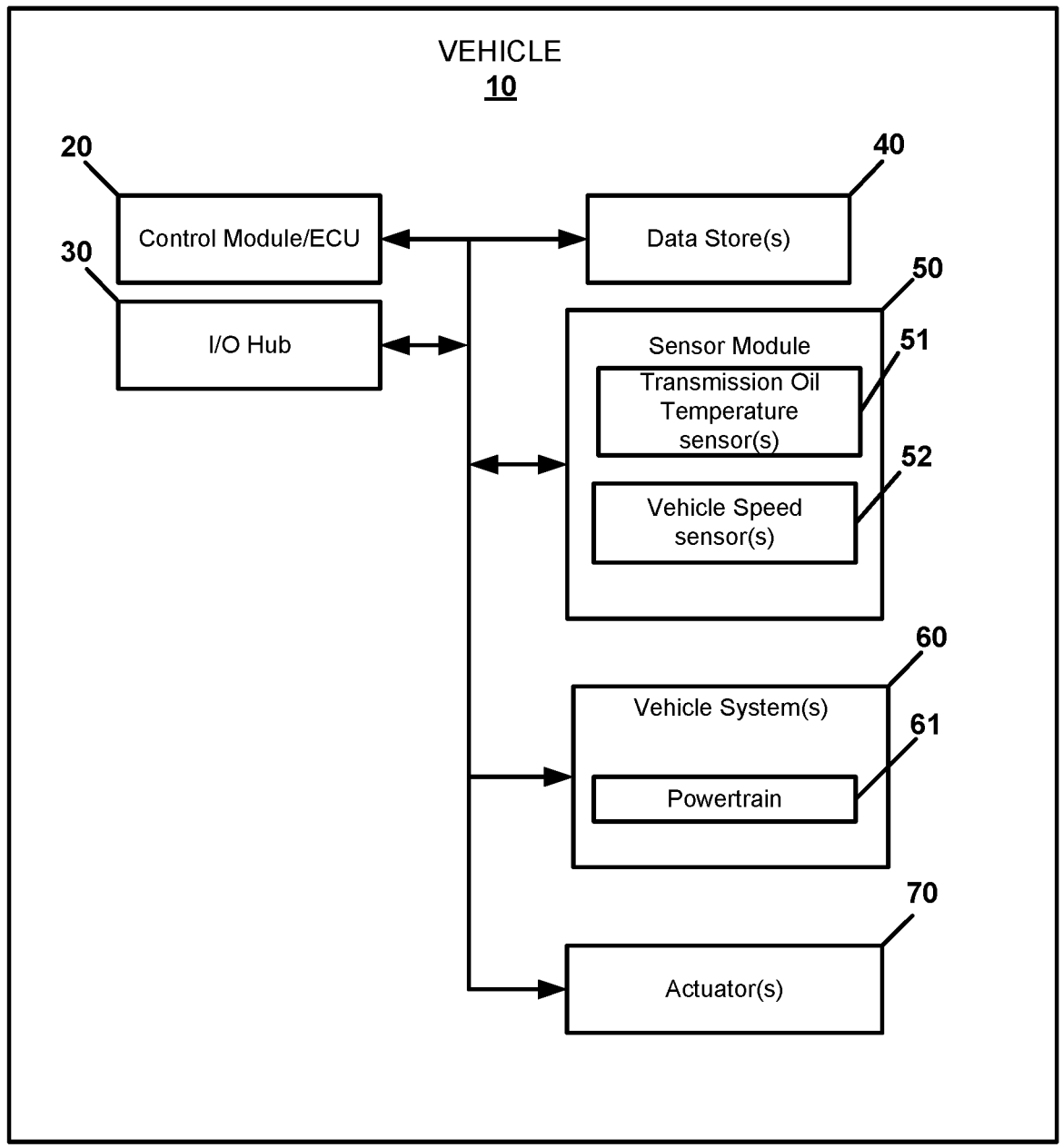
FIG. 1 illustrates a block diagram of an example vehicle, in accordance with one or more embodiments shown and described herein.

Turning to the figures, in which FIG. 1 illustrates an example vehicle 10 comprising a vehicle control module/ECU 20, an I/O hub 30, one or more data stores 40, a sensor module 50, vehicle systems 60, and one or more actuators 70. In accordance with one or more embodiments, the vehicle 10 comprises a mobility-as-a-service (MaaS) vehicle, a car, a truck, a van, a sport utility vehicle, a bus, etc. Embodiments, however, are not limited thereto, and thus, this disclosure contemplates the vehicle 10 comprising any suitable vehicle that falls within the spirit and scope of the principles of this disclosure. For example, the vehicle 10 may comprise a marine vehicle, an air vehicle, a space vehicle, or any other form of transport vehicle.

Figure 2:
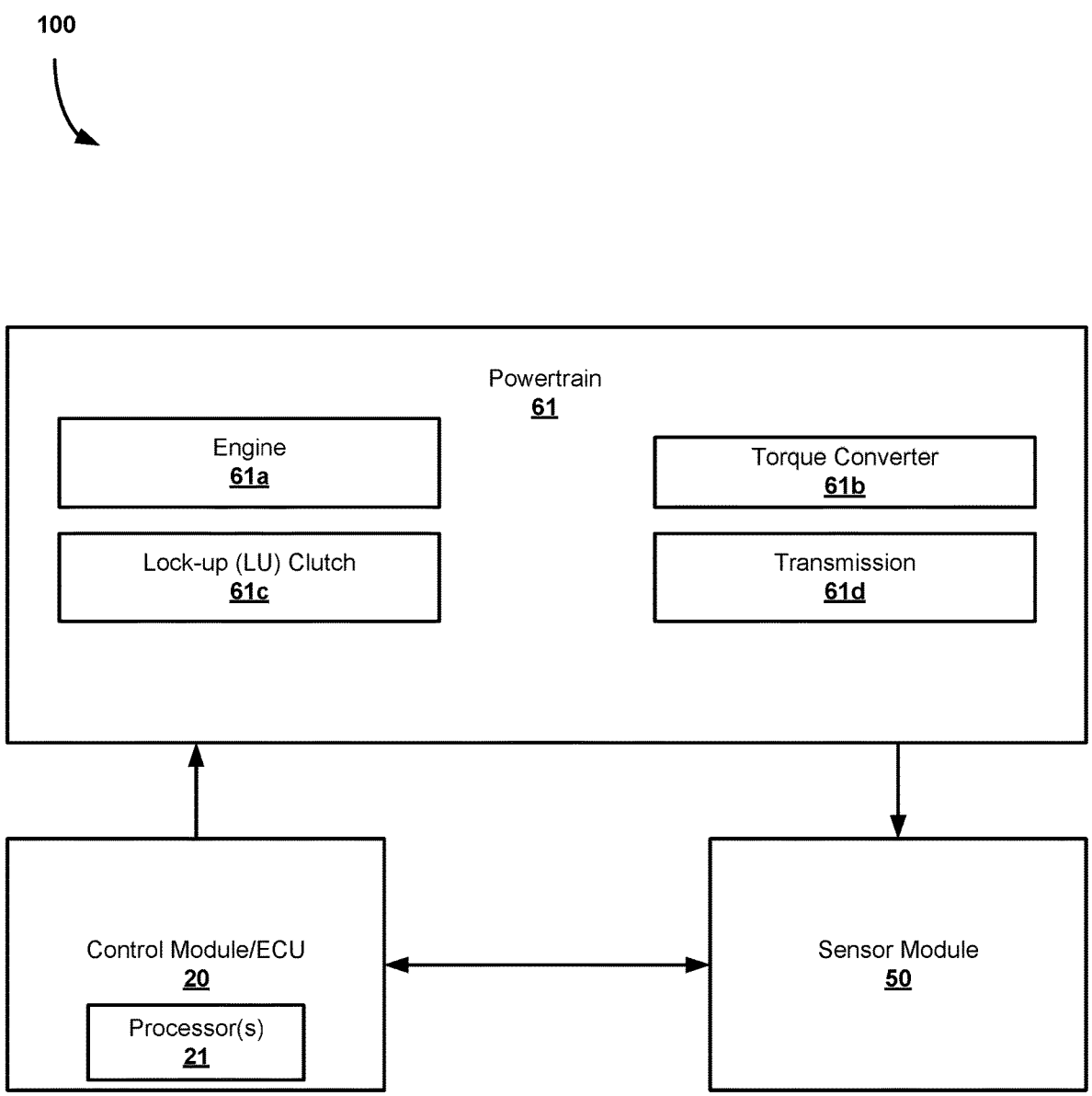
FIG. 2 illustrates a block diagram of an example vehicle powertrain system, in accordance with one or more embodiments shown and described herein.
Figure 3:
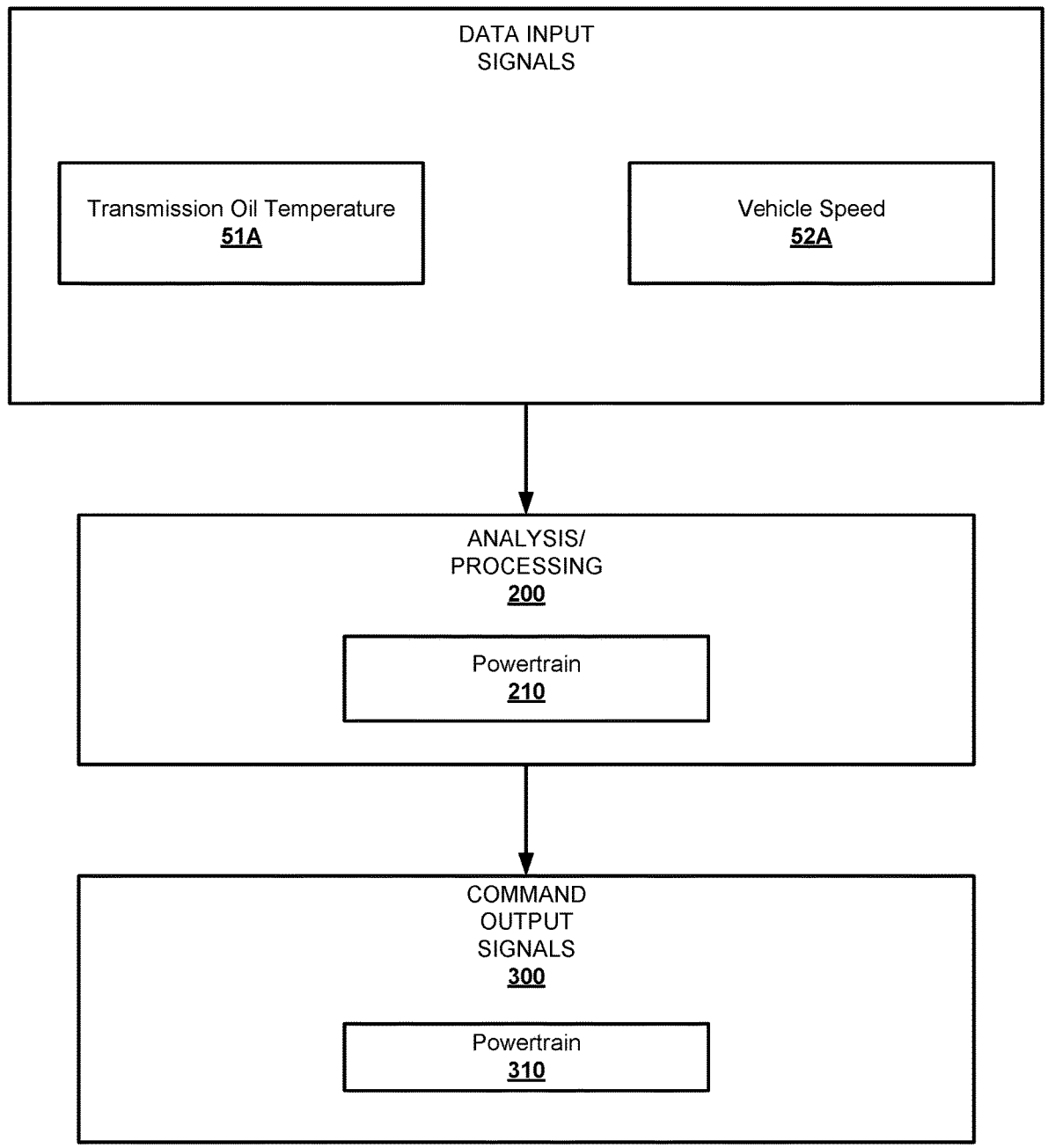
FIG. 3 illustrates a diagram of one or more vehicle control blocks, in accordance with one or more embodiments shown and described herein.

As illustrated in FIGS. 2 and 3, the vehicle systems 60 comprises a powertrain 61, that itself comprises an engine 61a, a torque converter 61b having a lock-up (LU) clutch 61c for connection to the vehicle transmission 61d. The vehicle control module/ECU 20 is configured to receive one or more data input signals to thereby control operation of the powertrain 61 (i.e., the engine 61a, the torque converter 61b, the lock-up (LU) clutch 61c, and the vehicle transmission 61d) in a manner that ensures early clock-up of the torque converter 61b to prevent excess heat caused by slippage when the vehicle 10 is operating at a low-speed or a stopped condition. In accordance with one or more embodiments, the vehicle powertrain system 100 comprises the control module/ECU 20, the sensor module 50, and the powertrain 61.

The control module/ECU 20 serves as a host, main, or primary control system of the vehicle 10. For example, the control module/ECU 20 may comprise an electronic or engine control unit (ECU). The control module/ECU 20 may comprise one or more processors 21. As set forth, described, and/or illustrated herein, "processor" means any component or group of components that are configured to execute any of the processes described herein or any form of instructions to carry out such processes or cause such processes to be performed. The processors 21 may be implemented with one or more general-purpose and/or one or more special-purpose processors. Examples of suitable processors include graphics processors, microprocessors, microcontrollers, DSP processors, and other circuitry that may execute software (e.g., stored on a non-transitory computer-readable medium). Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processors 21 may comprise at least one hardware circuit (e.g., an integrated circuit) configured to carry out instructions contained in program code. In embodiments in which there is a plurality of processors 21, such processors 21 may work independently from each other, or one or more processors may work in combination with each other.

In accordance with one or more embodiments, the I/O hub 30 is operatively connected to other systems and subsystems of the vehicle 10. The I/O hub 30 may comprise an input interface and an output interface. The input interface and the output interface may be integrated as a single, unitary interface, or alternatively, be separate as independent interfaces that are operatively connected.

In one or more embodiments, the input interface may be used by a user, such as, for example, an operator vehicle operator, driver, or remote operator of the vehicle 10, to input one or more data input signals relating to operation of the vehicle 10. The input interface is defined herein as any device, component, system, subsystem, element, or arrangement or groups thereof that enable information/data to be entered in a machine. The input interface may receive an input from the vehicle operator, driver, or remote operator of the vehicle 10. In an example, the input interface may comprise a user interface (UI), graphical user interface (GUI) such as, for example, a display, human-machine interface (HMI), or the like. Embodiments, however, are not limited thereto, and thus, this disclosure contemplates the input interface comprising any suitable configuration that falls within the spirit and scope of the principles of this disclosure. For example, the input interface may comprise a keypad, toggle switch, touch screen, multi-touch screen, button, joystick, mouse, trackball, microphone and/or combinations thereof.

The output interface is defined herein as any device, component, system, subsystem, element, or arrangement or groups thereof that enable information/data to be presented to the vehicle operator and/or a remote operator of the vehicle 10. The output interface may be configured to present information/data to the vehicle occupant and/or the remote operator. The output interface may comprise one or more of a visual display or an audio display such as a microphone, earphone, and/or speaker. One or more components of the vehicle 10 may serve as both a component of the input interface and a component of the output interface.

In accordance with one or more embodiments, the one or more data stores 40 are configured to store one or more types of data. The vehicle 10 may include one or more interfaces that enable one or more systems thereof to manage, retrieve, modify, add, or delete, the data stored in the data stores 40. The data stores 40 may comprise volatile and/or non-volatile memory. Examples of suitable data stores 40 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data stores 40 may be a component of the processors 21, or alternatively, may be operatively connected to the processors 21 for use thereby. As set forth, described, and/or illustrated herein, "operatively connected" may include direct or indirect connections, including connections without direct physical contact.

In accordance with one or more embodiments, the sensor module 50 is configured to, at least during operation of the vehicle 10, dynamically detect, capture, determine, assess, monitor, measure, quantify, and/or sense one or more operational features of the vehicle 10, including, but not limited to, vehicle speed, engine rotational speed, turbine rotational speed, gear, pedal position, LU clutch position, transmission oil temperature, etc. As set forth, described, and/or illustrated herein, "sensor" means any device, component, system, and/or subsystem that can perform one or more of detecting, determining, assessing, monitoring, measuring, quantifying, and sensing something. The one or more sensors may be configured to detect, determine, assess, monitor, measure, quantify and/or sense in real-time. As set forth, described, and/or illustrated herein, "real-time" means a level of processing responsiveness that a user, system, or subsystem senses as sufficiently immediate for a particular process or determination to be made, or that enables the processor to keep up with some external process.

In accordance with one or more embodiments, operation of the control module/ECU 20 may be implemented as computer readable program code that, when executed by a processor, implement one or more of the various processes set forth, described, and/or illustrated herein. The control module/ECU 20 may be a component of the processors 21, or alternatively, may be executed on and/or distributed among other processing systems to which the processors 21 are operatively connected. The control module/ECU 20 may include a set of logic instructions executable by the processors 21. Alternatively or additionally, the data stores 40 may contain such logic instructions. The logic instructions may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

In the illustrated one or more embodiments of FIGS. 2 and 3, the control module/ECU 20 may be configured to facilitate, via the sensor module 50, dynamic detection (as sensor data) of one or more operating states of the vehicle 10. Such operating states may include, but are not limited to, current LU clutch position, current vehicle speed ($V_{(sp)c}$), current engine rotational speed, current turbine rotational speed, current gear, and current transmission oil temperature. The captured sensor data may be located in a vehicle database of the data stores 40 or an external source (e.g., cloud-based data store(s)).

In accordance with one or more embodiments, one or more of the modules 20, 50 set forth, described, and/or illustrated herein may include artificial or computational intelligence elements, e.g., neural network, fuzzy logic, or other machine learning algorithms.

In accordance with one or more embodiment, one or more of the control module/ECU 20 and the one or more of the processors 21 are operatively connected to communicate with the vehicle powertrain system 61 and/or individual components thereof (i.e., the engine 61a, the torque converter 61b, the lock-up (LU) clutch 61c, and the vehicle transmission 61d). For example, as illustrated in FIG. 3, the one or more of the processors 21 are in communication to receive one or more data input signals 51A, 52A from the I/O hub 40, and in response thereto, send or transmit one or more command output signals 310 to the vehicle powertrain system 61. In particular, the control module/ECU 20 is to dynamically control the vehicle powertrain system 61 in a manner that achieves enhanced thermal management of the torque converter by preventing excess heat caused by slippage when the vehicle 10 is operating at a low-speed or a stopped condition.

The vehicle 10 may comprise one or more actuators 70 operatively connected (e.g., via wire and/or wireless communication) to the control module/ECU 20. The actuators 70, which may be any element or combination of elements configured to modify, adjust and/or alter operation of the vehicle powertrain system 61 and components thereof in response to receiving one or more command output signals 300 or other inputs from the one or more of the processors 21. In accordance with one or more embodiments, the one or more actuators 70 comprise a mechanical actuator or an electrical actuator. Embodiments, however, are not limited thereto, and thus, this disclosure contemplates the one or more actuators 70 comprising any suitable configuration that falls within the spirit and scope of the principles of this disclosure. For example, such suitable actuator configuration may comprise motors, pneumatic actuators, hydraulic actuators, thermal actuators, magnetic actuators, mechanical actuators, relays, and/or piezoelectric actuators, etc.

In accordance with one or more embodiments, the sensor module 50 comprises one or more vehicle transmission oil temperature sensors 51 and one or more vehicle speed sensors 52 operatively connected to the one or more processors 21, the data stores 30, and/or other elements, components, modules, systems, and subsystems of the vehicle 10. Embodiments, however, are not limited thereto. This disclosure contemplates the sensor module 50 comprising any suitable sensor architecture that permits practice of the one or more embodiments.

In accordance with one or more embodiments, the one or more vehicle transmission oil temperature sensors 51 are spatially arranged in part or in whole on, in close proximate to or adjacent to one or more components of the vehicle transmission 61d. The one or more vehicle transmission oil temperature sensors 51 are to dynamically detect, determine, assess, monitor, measure, quantify, as sensor data, the current transmission oil temperature during operation of the vehicle 10. In one or more example embodiments, the one or more vehicle transmission oil temperature sensors 51 comprise a thermocouple. Embodiments, however, are not limited thereto, and thus, this disclosure contemplates the vehicle transmission oil temperature sensors 51 comprising any suitable sensor architecture that permits practice of the one or more embodiments. The one or more vehicle transmission oil temperature sensors 51 may work independently from each other, or alternatively, may work in combination with each other. The one or more vehicle transmission oil temperature sensors 51 may be used in any combination, and may be used redundantly to validate and improve the accuracy of the detection.

The one or more vehicle speed sensors 52 are spatially arranged on, in close spatial proximity to, or adjacent to one or more of the vehicle wheels to dynamically detect, determine, assess, monitor, measure, quantify, as sensor data, the current speed of the vehicle 10 based on the wheel speed of one or more of the wheels. The one or more vehicle speed sensors 52 may work independently from each other, or alternatively, may work in combination with each other. The one or more vehicle speed sensors 52 may be used in any combination, and may be used redundantly to validate and improve the accuracy of the detection.

In the illustrated embodiment of FIG. 3, the control module/ECU 20 is to receive one or more data input signals 51A, 52A from the sensor module 50, and in response thereto, the one or more processors 21 are to conduct an analysis 200, including, but not limited to, a vehicle powertrain analysis 210. In accordance with one or more embodiments, the control module/ECU 20 is configured to initiate different control sequences for controlling the powertrain system 61 based on the detected transmission oil temperature. The first control sequence is executed in a vehicle operation condition in which, during an open operating state of the LU clutch 61c, a sweep the engine torque downward is done to prevent excessive slip and also prevent an unintended torque drop from the vehicle operator. The second control sequence is executed to sweep the engine torque down during a lock-up control phase, which would facilitate enhanced launch driveability and only reduce the engine toque drop during engagement of the LU clutch 61c.

For example, in the vehicle powertrain analysis 210, the control module/ECU 20, using comparator logic, is configured to compare the detected current transmission oil temperature to a predetermined first threshold transmission oil temperature. In accordance with one or more embodiments, the predetermined first threshold transmission oil temperature is about 140° C. Embodiments, however, are not limited thereto, and thus, this disclosure contemplates the predetermined first threshold transmission oil temperature comprising any suitable temperature that falls within the spirit and scope of the principles of this disclosure. This disclosure contemplates utilizing an offset about the predetermined first threshold transmission oil temperature in order to provide a temperature hysteresis to reduce the amount of control cycling. Accordingly, a hysteresis temperature may be offset from the predetermined first threshold transmission oil temperature by about 5° C. to 10° C. (e.g., a hysteresis threshold transmission oil temperature range of about 145° C. to 150° C.).

Should the comparison reveal that the detected current transmission oil temperature is less than the predetermined first threshold transmission oil temperature, i.e., is at a permissible temperature that is not indicative of excessive heating, the control sequence is not initiated. On the other hand, should the comparison reveal that the detected current transmission oil temperature is greater than the predetermined first threshold transmission oil temperature, the control module/ECU 20, using comparator logic, is configured to make a second comparison: in this instance, the detected current transmission oil temperature to a predetermined second threshold transmission oil temperature that is greater than the predetermined first threshold transmission oil temperature.

In accordance with one or more embodiments, the predetermined first threshold transmission oil temperature is about 150° C. Embodiments, however, are not limited thereto, and thus, this disclosure contemplates the predetermined second threshold transmission oil temperature comprising any suitable temperature that falls within the spirit and scope of the principles of this disclosure. This disclosure contemplates utilizing an offset about the predetermined second threshold transmission oil temperature in order to provide a temperature hysteresis to reduce the amount of control cycling. Accordingly, a hysteresis temperature may be offset from the predetermined second threshold transmission oil temperature by about 5° C. to 10° C. (e.g., a hysteresis threshold transmission oil temperature range of about 155° C. to 160° C.).

Should the comparison reveal that the detected current transmission oil temperature is less than the predetermined second threshold transmission oil temperature (but still greater than the predetermined first threshold transmission oil temperature), and the LU clutch 61c is in an open operating condition, a first control sequence is initiated in order to reduce slip and facilitate engagement of the LU clutch 61c in response to a lock-up command from the vehicle operator. Responsive to a command from the vehicle operator to change the operating state of the lock-up clutch from disengaged (open) to engaged (closed), the control module/ECU 20 is to issue a command output signal 310 to the vehicle powertrain system 61 to reduce the engine torque (input torque to the torque converter 61c) to a predetermined target minimum threshold torque value in order to reduce the amount of slip. In essence, the input torque is swept down to the predetermined target minimum threshold torque value before commanding an increase in lock-up pressure.

The engine torque is maintained at the predetermined target minimum threshold torque value until the LU clutch 61c is in an engaged operating state. Once the LU clutch 61c is in a fully engaged operating state, the engine torque is increased from the predetermined target minimum threshold torque value to a predetermined target maximum threshold torque value.

Should the comparison reveal that the detected current transmission oil temperature is greater than the predetermined second threshold transmission oil temperature, the LU clutch 61c is in an open operating condition, and the detected current vehicle speed ($V_{(sp)c}$) is less than the predetermined threshold vehicle speed ($V_{(sp)th}$), a second control sequence is initiated in order to reduce slip and facilitate engagement of the LU clutch 61c in response to a lock-up command from the vehicle operator. The control module/ECU 20 is to issue a command output signal 310 to the vehicle powertrain system 61 to reduce the engine torque (input torque to the torque converter 61c) to the predetermined target minimum threshold torque value in order to reduce the amount of slip. In essence, the input torque is swept down to the predetermined target minimum threshold torque value before commanding an increase in lock-up pressure.

The engine torque is maintained at the predetermined target minimum threshold torque value until the LU clutch 61c is in at least a partially engaged operating state. Once the LU clutch 61c is in a fully engaged operating state, the engine torque is increased from the predetermined target minimum threshold torque value to a predetermined target maximum threshold torque value.

In accordance with one or more embodiments, in response to the vehicle powertrain analysis 210 and a current operating state of the LU clutch 61c of the torque converter, the one or more processors 21 are to execute the set of instructions to control the vehicle powertrain system 61 (e.g., one or more of the engine 61a, the torque converter 61b, the LU clutch 61c, and the vehicle transmission 61d) by sending one or more command output signals 310 to reduce slip before engaging the LU clutch 61c.

Figure 4:
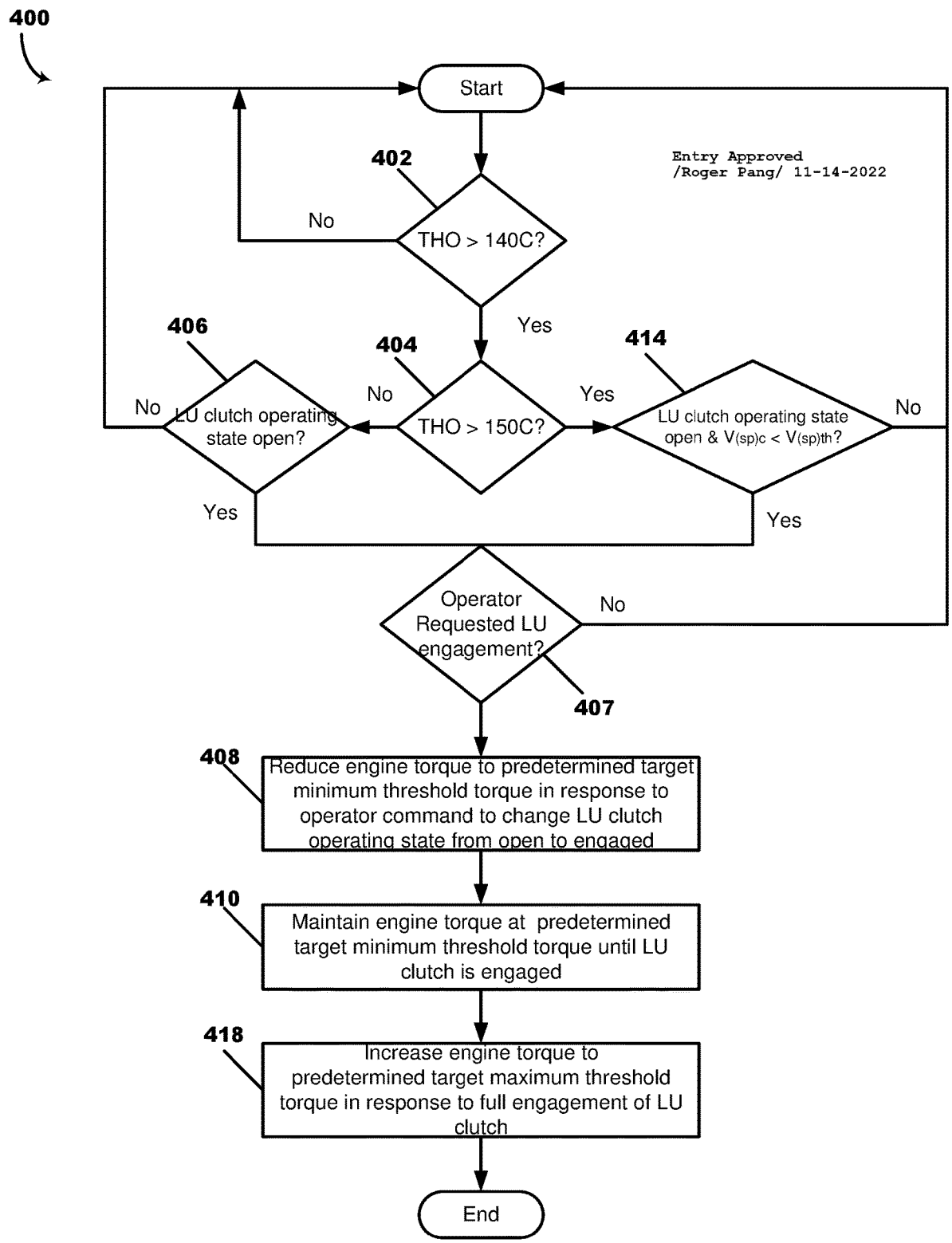
FIG. 4 illustrates a schematic diagram of an example method of controlling a vehicle, in accordance with one or more embodiments shown and described herein.

In the illustrated example of FIG. 4, a flowchart of method 400, for controlling a vehicle is provided. In one or more examples, the flowchart of the method 400 may be implemented by the one or more processors 21. For example, the one or more processors 21 are configured to implement the method 400 using logic instructions (e.g., software), configurable logic, fixed-functionality hardware logic, etc., or any combination thereof. In one or more examples, software executed by the control module/ECU 20 provides functionality described or illustrated herein. In particular, software (e.g., stored on a non-transitory computer-readable medium)) executing by the one or more processors 21 is configured to perform one or more control blocks of the method 400 set forth, described, and/or illustrated herein, or provides functionality set forth, described, and/or illustrated.

In the illustrated example of FIG. 4, illustrated control block 402 includes comparing a detected current transmission oil temperature to a predetermined first threshold transmission oil temperature. As noted herein, the predetermined first threshold transmission oil temperature is about 140° C. Embodiments, however, are not limited thereto, and thus, this disclosure contemplates the predetermined first threshold transmission oil temperature comprising any suitable temperature that falls within the spirit and scope of the principles of this disclosure.

If "No," i.e., the comparison reveals that the detected current transmission oil temperature is less than the predetermined first threshold transmission oil temperature, i.e., is at a permissible temperature that is not indicative of excessive heating, the method 400 returns to start.

If "Yes," i.e., the comparison reveals that the detected current transmission oil temperature is greater than the predetermined first threshold transmission oil temperature, the method 400 proceeds to control block 404, which includes comparing the detected current transmission oil temperature to a predetermined second threshold transmission oil temperature that is greater than the predetermined first threshold transmission oil temperature. As noted herein, the predetermined second threshold transmission oil temperature is about 150° C. Embodiments, however, are not limited thereto, and thus, this disclosure contemplates the predetermined second threshold transmission oil temperature comprising any suitable temperature that falls within the spirit and scope of the principles of this disclosure.

In control block 404, if "No," i.e., the comparison reveals that the detected current transmission oil temperature is less than the predetermined second threshold transmission oil temperature (but still greater than the predetermined first threshold transmission oil temperature), the method 400 proceeds to control block 406, which includes determining whether the LU clutch 61c is in an open operating condition.

In control block 406, if "No," i.e., the LU clutch 61c is in a closed operating condition, then the method 400 returns to start.

In control block 406, if "Yes,".e., the LU clutch 61c is in an open operating condition, then the method 400 proceeds to control block 407, which includes determining whether an operator has initiated LU clutch engagement. In control block 407, if an operator has initiated LU clutch engagement, the method proceeds to operation 408, where the engine torque may be reduced to a predetermined target minimum threshold torque value in order to reduce the amount of slip before fully engaging the LU clutch 61c.

The method 400 may then proceed to illustrated control block 410, which includes maintaining the engine torque at the predetermined target minimum threshold torque value until the LU clutch 61c is in an engaged operating state.

The method 400 may then proceed to illustrated control block 418, which includes increasing the engine torque from the predetermined target minimum threshold torque value to a predetermined target maximum threshold torque value once the LU clutch 61c is in a fully engaged operating state. The method 400 may terminate or end after execution of control block 412.

If at the control block 404 the determination is "Yes," i.e., the comparison reveals that the detected current transmission oil temperature is greater than the predetermined second threshold transmission oil temperature, the method 400 proceeds to control block 414, which includes determining whether the LU clutch 61c is in an open operating condition and whether the detected current vehicle speed ($V_{(sp)c}$) is less than the predetermined threshold vehicle speed ($V_{(sp)th}$).

In control block 414, if "No," the method 400 returns to start.

In control block 414, if "Yes," i.e., the LU clutch 61c is in an open operating condition and the detected current vehicle speed ($V_{(sp)c}$) is less than the predetermined threshold vehicle speed ($V_{(sp)th}$), the method 400 proceeds to control block 407, which includes determining whether an operator has initiated LU clutch engagement. In control block 407, if an operator has initiated LU clutch engagement, the method proceeds to operations 408 and 410, where the engine torque may be reduced and maintained to/at a predetermined target minimum threshold torque until the LU clutch is in at least a partially engaged operating state.

The method 400 then proceeds to control block 418, which includes increasing the engine torque from the predetermined target minimum threshold torque value to a predetermined target maximum threshold torque value in response to full engagement of the LU clutch. The method 400 may terminate or end after execution of control block 418.

Figure 5:
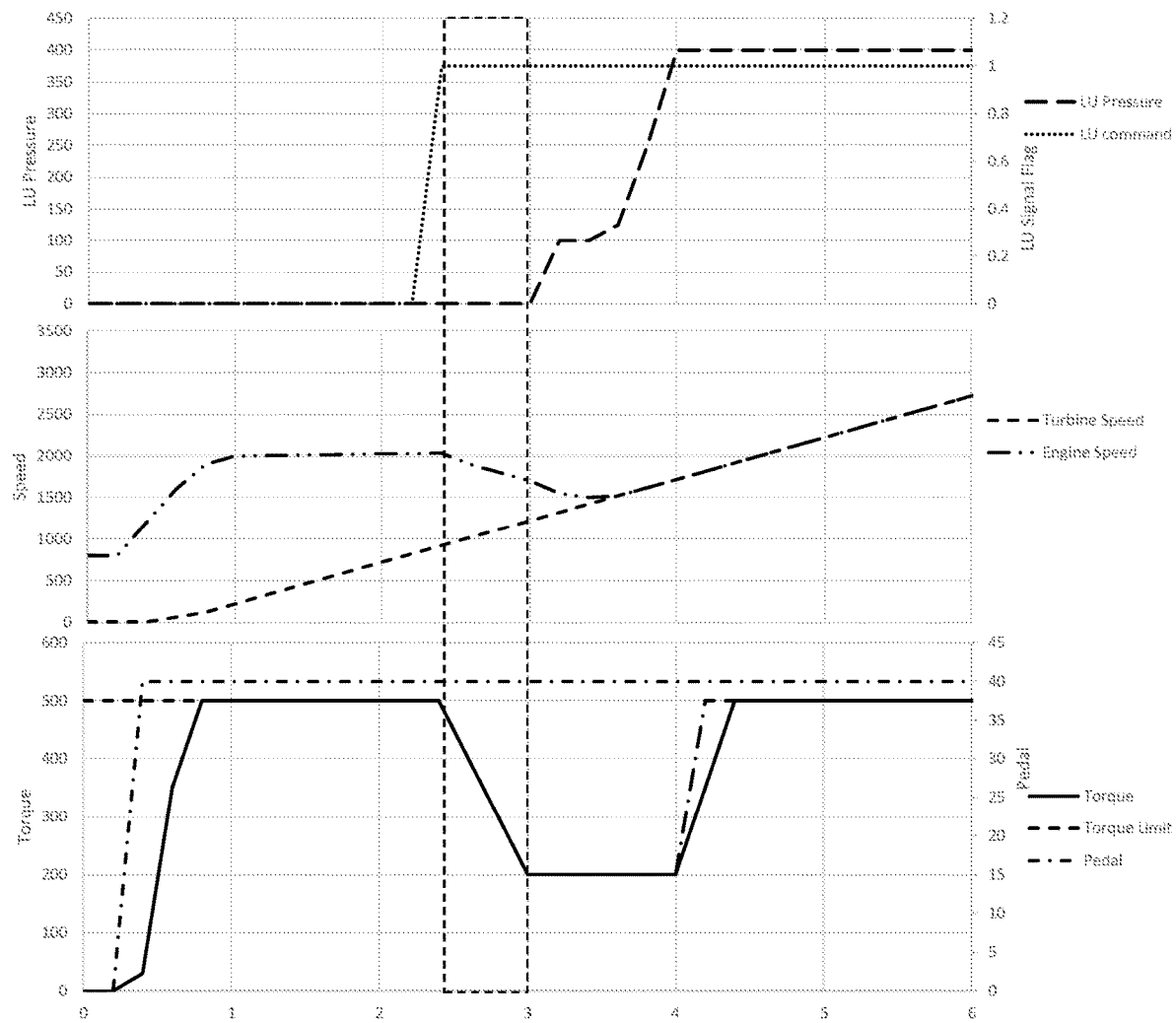
FIG. 5 illustrates time graphs of an example operating sequence of a vehicle powertrain system in a first operating state, in accordance with one or more embodiments shown and described herein.
Figure 6:
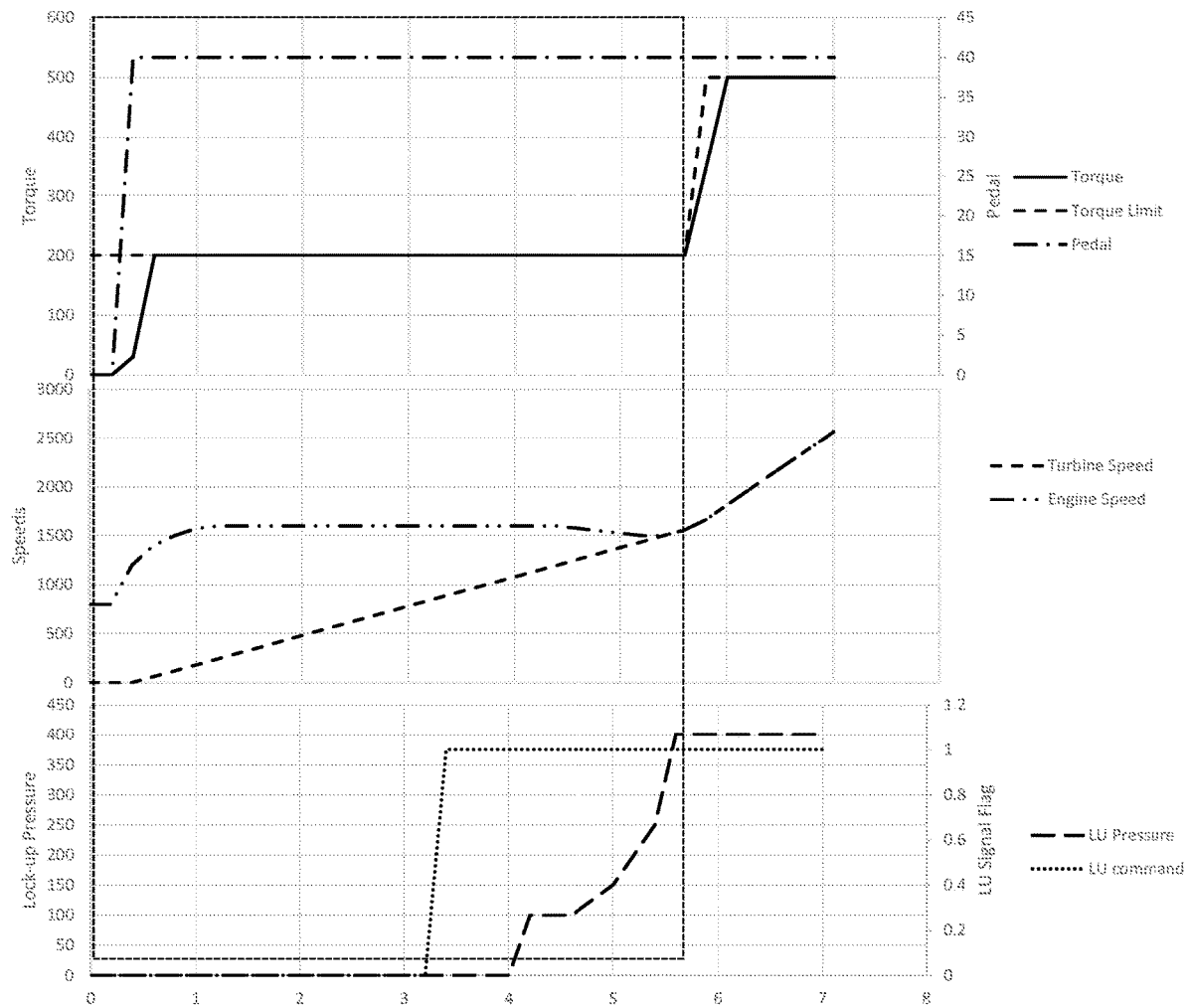
FIG. 6 illustrates time graphs of an example operating sequence of a vehicle powertrain system in a second operating state, in accordance with one or more embodiments shown and described herein.

FIGS. 5 and 6 respectively illustrate example time graphs of operating sequences (occurring between a time period of 0 to 6 seconds and 0 to 7 seconds) of the vehicle powertrain system 61 in an operating state in which a lock-up command is made by the control module/ECU 20 (FIG. 5), and in operating state in which the LU clutch 61c is open (FIG. 6). Control of the powertrain system 61 during of each operating sequence is to be performed by the control module/ECU 20.

In FIG. 5, the vertically-extending hatched lines between times at approximately 2.5 seconds through 3 seconds represent times of interest during this operating sequence. The first graph represents LU pressure (and corresponding LU signal command from the control module/ECU 20) versus time, the second graph represents engine rotational speed and turbine rotational speed versus time, and the third graph represents engine torque (and corresponding accelerator pedal input by the driver/operator) versus time. The graphs are also temporally aligned and occur contemporaneously. Between approximately $t_1=0$ to $t_2=2.5$ seconds, the slip ratio increases until the first control sequence is executed in which the control module/ECU 20 issues a command signal reducing the engine torque to a predetermined target minimum threshold torque value in response to a vehicle operator LU command. This action results in reducing the slip ratio to a value that permits engagement of the LU clutch 61c. Once the LU clutch 61c fully engaged, the control module/ECU 20 issues another command signal (at approximately $t_3=4.0$ seconds) to increase the torque from the predetermined target minimum threshold torque value to a predetermined target maximum threshold torque value.

In FIG. 6, the vertically-extending hatched lines between times at approximately 0 seconds through 5.5 seconds represent times of interest during this operating sequence. The first graph represents engine torque (and corresponding accelerator pedal input by the driver/operator) versus time, the second graph represents engine rotational speed and turbine rotational speed versus time, and the third graph represents LU pressure (and corresponding LU signal command from the control module/ECU 20) versus time. The graphs are also temporally aligned and occur contemporaneously. Between approximately $t_1=0$ to $t_2=3.2$ seconds, the slip ratio increases until the second control sequence is executed in which the control module/ECU 20 issues a command signal reducing the engine torque to a predetermined target minimum threshold torque value in response to a vehicle operator LU command. This action results in reducing the slip ratio to a value that permits engagement of the LU clutch 61c. Once the LU clutch 61c fully engaged, the control module/ECU 20 issues another command signal (at approximately $t_3=5.5$ seconds) to increase the torque from the predetermined target minimum threshold torque value to a predetermined target maximum threshold torque value.

The terms "coupled," "attached," or "connected" may be used herein to refer to any type of relationship, direct or indirect, between the components in question, and may apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the embodiments of the present disclosure may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A vehicle powertrain system, comprising:
   a powertrain having an engine, a transmission, and a torque converter; and
   a control module having one or more processors, to execute a set of instructions that cause the one or more processors to:
      conduct, in response to sensor data in connection with a detected current vehicle speed and a detected current transmission oil temperature, a vehicle powertrain analysis of the sensor data; and
      control the powertrain in response to the vehicle powertrain analysis and whether an operator has commanded an operating state of a lock-up clutch of the torque converter to change from disengaged to engaged.

2. The vehicle powertrain system of claim 1, wherein the set of instructions cause the one or more processors to compare the detected current transmission oil temperature to a predetermined first threshold transmission oil temperature.

3. The vehicle powertrain system of claim 2, wherein the set of instructions cause the one or more processors to compare, in response to a determination that the detected current transmission oil temperature is greater than the predetermined first threshold transmission oil temperature, the detected current transmission oil temperature to a predetermined second threshold transmission oil temperature and the detected vehicle speed to a predetermined threshold vehicle speed.

4. The vehicle powertrain system of claim 3, wherein the set of instructions cause the one or more processors to, in response to a determination that the detected current transmission oil temperature is greater than the predetermined first threshold transmission oil temperature and less than the predetermined second threshold transmission oil temperature, and the lock-up clutch is in a disengaged operating state:
   reduce the engine torque to a predetermined target minimum threshold torque value in response to a vehicle operator command to change the operating state of the lock-up clutch from disengaged to engaged, and
   maintain the engine torque at the predetermined target minimum threshold torque value until the LU clutch is in at least a partially engaged operating state.

5. The vehicle powertrain system of claim 4, wherein the set of instructions cause the one or more processors to increase the engine torque, in response to full engagement of the LU clutch, from the predetermined target minimum threshold torque value to a predetermined target maximum threshold torque value.

6. The vehicle powertrain system of claim 3, wherein the set of instructions cause the one or more processors to, in response to a determination that the detected current transmission oil temperature is greater than the predetermined first threshold transmission oil temperature and the predetermined second threshold transmission oil temperature, the lock-up clutch is in a disengaged operating state, and the detected vehicle speed is less than the predetermined threshold vehicle speed:
   reduce the engine torque to a predetermined target minimum threshold torque, and
   maintain the engine torque at the predetermined target minimum threshold torque value until the LU clutch is in at least a partially engaged operating state.

7. The vehicle powertrain system of claim 6, wherein the set of instructions cause the one or more processors to increase the engine torque, in response to full engagement of the LU clutch, from the predetermined target minimum threshold torque value to a predetermined target maximum threshold torque value.

8. A computer program product for a vehicle including a powertrain having an engine, a transmission, and a torque converter, the computer program product including at least one computer readable medium comprising a set of instructions, which when executed by one or more processors, cause the one or more processors to:
   conduct, in response to sensor data in connection with a detected current vehicle speed and a detected current transmission oil temperature, a vehicle powertrain analysis of the sensor data; and
   control the powertrain in response to the vehicle powertrain analysis and whether an operator has commanded an operating state of a lock-up clutch of the torque converter to change from a disengaged to engaged state.

9. The computer program product of claim 8, wherein the set of instructions cause the one or more processors to compare the detected current transmission oil temperature to a predetermined first threshold transmission oil temperature.

10. The computer program product of claim 9, wherein the set of instructions cause the one or more processors to compare, in response to a determination that the detected current transmission oil temperature is greater than the predetermined first threshold transmission oil temperature, the detected current transmission oil temperature to a predetermined second threshold transmission oil temperature and the detected vehicle speed to a predetermined threshold vehicle speed.

11. The computer program product of claim 10, wherein the set of instructions cause the one or more processors to, in response to a determination that the detected current transmission oil temperature is greater than the predetermined first threshold transmission oil temperature and less than the predetermined second threshold transmission oil temperature, and the lock-up clutch is in a disengaged operating state:
   reduce the engine torque to a predetermined target minimum threshold torque value in response to vehicle operator command to change the operating state of the lock-up clutch from disengaged to engaged, and
   maintain the engine torque at the predetermined target minimum threshold torque value until the LU clutch is in at least a partially engaged operating state.

12. The computer program product of claim 11, wherein the set of instructions cause the one or more processors to increase the engine torque, in response to a fully engaged operating state of the LU clutch, from the predetermined target minimum threshold torque value to a predetermined target maximum threshold torque value.

13. The computer program product of claim 10, wherein the set of instructions cause the one or more processors to, in response to a determination that the detected current transmission oil temperature is greater than the predetermined first threshold transmission oil temperature and greater than the predetermined second threshold transmission oil temperature, and the lock-up clutch is in a disengaged operating state, and the detected vehicle speed is less than the predetermined threshold vehicle speed:
  reduce the engine torque to a predetermined target minimum threshold torque, and
  maintain the engine torque at the predetermined target minimum threshold torque value until the LU clutch is in at least a partially engaged operating state.

14. The computer program product of claim 13, wherein the set of instructions cause the one or more processors to increase the engine torque, in response to full engagement of the LU clutch, from the predetermined target minimum threshold torque value to a predetermined target maximum threshold torque value.

15. A method of controlling a vehicle including a powertrain having an engine, a transmission, and a torque converter, the method comprising:
  conducting, in response to sensor data in connection with a detected current vehicle speed and a detected current transmission oil temperature, a vehicle powertrain analysis of the sensor data; and
  controlling the powertrain in response to the vehicle powertrain analysis and whether an operator has commanded an operating state of a lock-up clutch of the torque converter to change from a disengaged to engaged state.

16. The method of claim 15, wherein conducting the vehicle powertrain analysis comprises:
  comparing the detected current transmission oil temperature to a predetermined first threshold transmission oil temperature, and
  comparing, in response to a determination that the detected current transmission oil temperature is greater than the predetermined first threshold transmission oil temperature, the detected current transmission oil temperature to a predetermined second threshold transmission oil temperature and the detected vehicle speed to a predetermined threshold vehicle speed.

17. The method of claim 16, wherein controlling the powertrain comprises, in response to a determination that the detected current transmission oil temperature is greater than the predetermined first threshold transmission oil temperature and less than the predetermined second threshold transmission oil temperature, and the lock-up clutch is in a disengaged operating state:
  reduce the engine torque to a predetermined target minimum threshold torque value in response to vehicle operator command to change the operating state of the lock-up clutch from disengaged to engaged, and
  maintain the engine torque at the predetermined target minimum threshold torque value until the LU clutch is in at least a partially engaged operating state.

18. The method of claim 15, wherein controlling the powertrain comprises increasing the engine torque, in response to a fully engaged operating state of the LU clutch, from the predetermined target minimum threshold torque value to a predetermined target maximum threshold torque value.

19. The method of claim 15, wherein controlling the powertrain comprises, in response to a determination that the detected current transmission oil temperature is greater than the predetermined first threshold transmission oil temperature and greater than the predetermined second threshold transmission oil temperature, the lock-up clutch is in a disengaged (open) operating state, and the detected vehicle speed is less than the predetermined threshold vehicle speed:
  reducing the engine torque to a predetermined target minimum threshold torque, and
  maintaining the engine torque at the predetermined target minimum threshold torque value until the LU clutch is in at least a partially engaged operating state.

20. The method of claim 19, wherein controlling the powertrain comprises increasing the engine torque, in response to full engagement of the LU clutch, from the predetermined target minimum threshold torque value to a predetermined target maximum threshold torque value.

* * * * *